United States Patent [19]

Watanabe et al.

[11] 4,056,826
[45] Nov. 1, 1977

[54] SUBCARRIER REGENERATION CIRCUIT FOR COLOR TELEVISION RECEIVERS

[75] Inventors: Yasuaki Watanabe; Yukio Okabe; Mitsuru Hayakawa, all of Yokohama, Japan

[73] Assignee: Victor Company of Japan, Limited, Japan

[21] Appl. No.: 732,598

[22] Filed: Oct. 15, 1976

[30] Foreign Application Priority Data

Oct. 16, 1975 Japan .................... 50-140053[U]

[51] Int. Cl.² ............................................. H04N 9/46
[52] U.S. Cl. .................................................... 358/19
[58] Field of Search .............. 358/8, 17, 19; 307/232; 329/50; 328/133

[56] References Cited

U.S. PATENT DOCUMENTS 3,610,955  10/1971  Blaser et al. .................... 358/19 X
3,860,954  1/1975   Tsuchiya ......................... 358/19 X Primary Examiner—John C. Martin
Assistant Examiner—Aristotelis M. Psitos
Attorney, Agent, or Firm—Robert E. Burns; Emmanuel J. Lobato; Bruce L. Adams

[57] ABSTRACT

In a subcarrier regeneration circuit for color television receivers, a phase detector output is sampled by a signal sample-and-hold circuit and a bias sample-and-hold circuit to develop a voltage between the outputs of the two sample-and-hold circuits to control the frequency of a 3.58 MHz subcarrier generated by a voltage controlled oscillator. The oscillator output is phase shifted by 90° and applied to one input of the phase detector for comparison with a gated color burst. The signal sample-and-hold circuit samples the phase detector output during the interval of the color burst, while the bias sample-and-hold circuit samples the phase detector output during an interval which is substantially equal to the flyback interval minus the color burst interval.

6 Claims, 5 Drawing Figures

SUBCARRIER REGENERATION CIRCUIT FOR COLOR TELEVISION RECEIVERS

The present invention relates generally to color television receivers, and in particular it relates to an improvement to a color subcarrier regeneration circuit in which frequency control voltage is derived from signal and bias sample-and-hold circuits by sampling the phase detector output during substantially equal intervals.

The color subcarrier regeneration circuit comprises a phase detector, signal and bias sample-and-hold circuits connected to the output of the phase detector and a voltage controlled oscillator whose output is phase shifted by 90° and applied to one input of the phase detector for comparison in phase with a gated color burst. The voltage controlled oscillator generates a 3.58 MHz color subcarrier which is under the control of the voltage difference between the outputs from the two sample-and-hold circuits. In the prior art color subcarrier regeneration circuit, the output from the phase detector is sampled on the one hand by the signal sample-and-hold during the interval of a color burst, and on the other hand, by the bias sample-and-hold during the interval of each forward line scan. Because of the difference between the sampling intervals, the charges stored on the two sample-and-hold circuits tend to release at different discharge rates, thereby causing a drift in the frequency control voltage developed across the two sample-and-hold circuits.

The primary object of the present invention is to overcome this disadvantage by sampling the phase detector output at equal intervals which are obtained by processing a burst gating pulse and a flyback or retrace pulse through a subtraction circuit.

In accordance with the present invention, there is provided a subcarrier regeneration circuit for a color television receiver adapted to receive a composite color television signal including a color burst contained in a flyback interval and a chroma signal between successive ones of the flyback intervals, the subcarrier regeneration circuit comprising a phase detector for generating an output representative of the difference in phase between the color burst and a reference subcarrier, a first sample-and-hold circuit operable to sample the output from the phase detector during the interval of the color burst and storing the sampled signal into a first capacitor, means for generating a sampling pulse with a duration equal to the flyback interval minus the interval of the color burst, a second sample-and-hold circuit operable to sample the output from the phase detector during the interval of the sampling pulse and storing the sampled signal into a second capacitor, and a voltage controlled oscillator receptive of the voltage difference between the first and second capacitors to generate a signal at the reference subcarrier and operable to control the frequency and phase of the subcarrier in accordance with said voltage difference.

The invention will be further described in more detail with reference to the accompanying drawings, in which.

Figure 1:
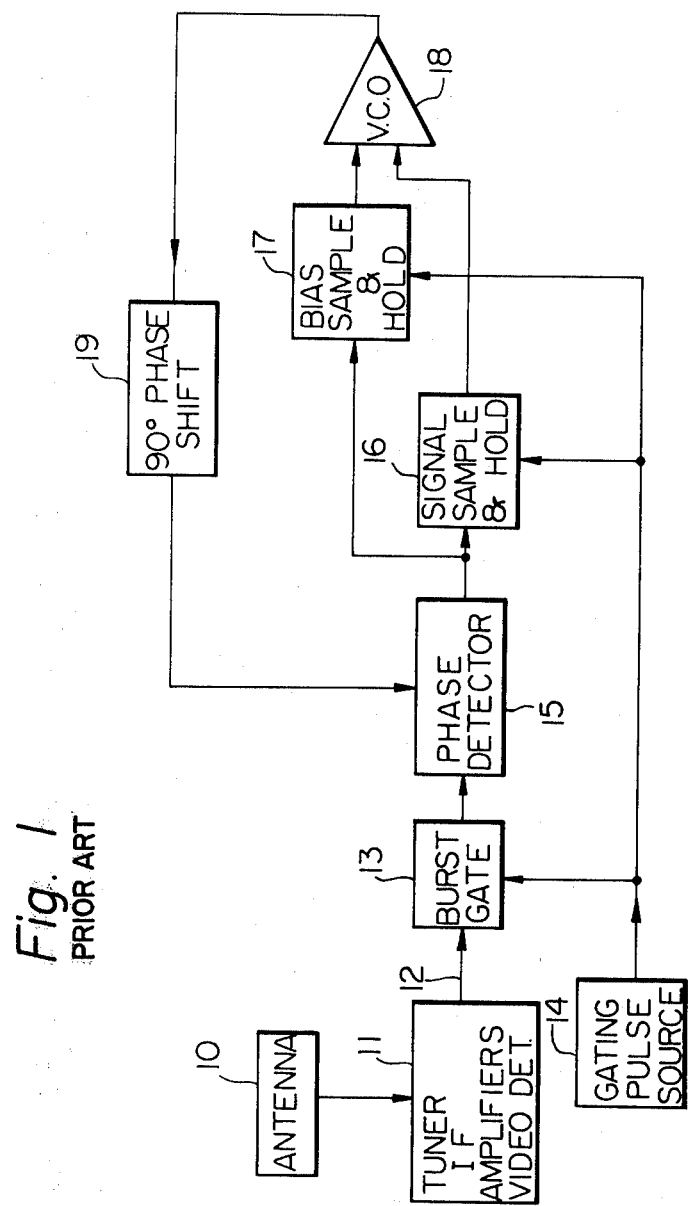
FIG. 1 is an embodiment of the prior art color subcarrier regeneration circuit in schematic form.

FIG. 1 illustrates the prior art phase detector circuit in block form in which a transmitted color burst is received by an antenna 10 and passed through a processor 11 which contains the tuner, video IF amplifier, video detector, and then on lead 12 to a burst gate 13. From a gating pulse source 14, a gate control signal is applied to the burst gate 13 to pass the color burst to one input of a phase detector 15. A signal sample-and-hold circuit 16 and a bias sample-and-hold circuit 17 are provided having their inputs connected together to the output of the phase detector 15 and their outputs connected to first and second inputs, respectively, of a voltage controlled oscillator 18 to generate a 3.58 MHz color subcarrier. The sample-and-hold 16 samples the detected signal during the period of the burst gate and stores and sampled signal in a filter capacitor (not shown). The sample-and-hold 17 provides a reference potential. The gating pulse from source 14 is applied to the sample-and-hold 16 and its inverted pulse is applied to the sample-and-hold 17 to sample a reference level during the interval between successive gating pulses. The output from the voltage controlled oscillator 18 is phase shifted by 90° at 19 and applied to the second input of the phase detector 15 for comparison in phase with the color burst applied to the first input thereof. Since the color burst is transmitted during the flyback period between successive forward line scans, the sampling period of the circuit 16 is only 5 microseconds while that of the circuit 17 is 58.5 microseconds which is about eleven times greater than the former (the transmitted burst signal persists for only about 2.5 microseconds, but the sampling period have a duration about 5 microseconds to prevent loss of the burst). As a result, the charge stored in the sample-and-hold 16 and 17 tends to release through leakage paths at different rates. The discharge at different rates is particularly severe when the circuit is operated in a high humidity environment, and undesirable especially when the voltage controlled oscillator 18 employs a transistor of low current amplification in its input stage which draws a substantial amount of current from the base of the transistor.

Figure 2:
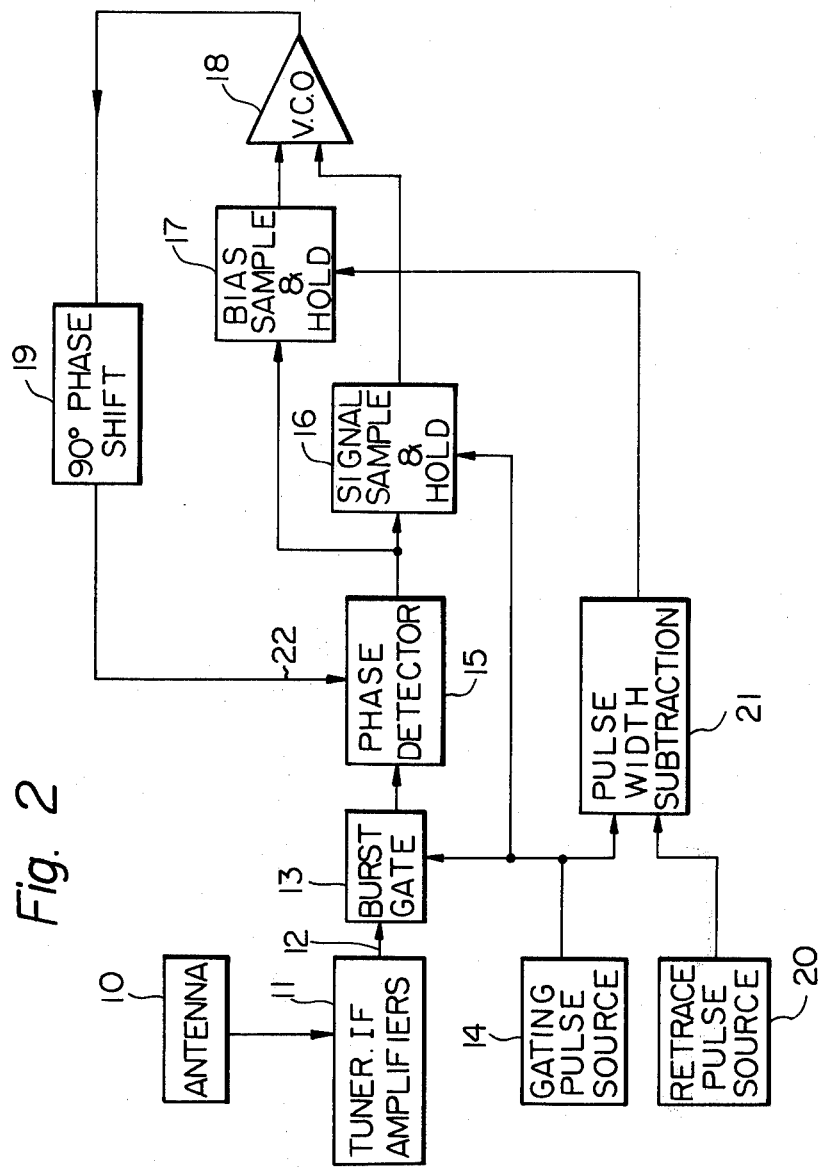
FIG. 2 is an embodiment of the present invention in schematic form.

In FIG. 2 is shown an embodiment of the present invention, which embodiment is an improvement over the prior art just described.

For ease of comparison identical numbers are used to indicate similar parts to those shown in FIG. 1. The burst gate control signal from source 14 is applied to a first input to a pulse-width subtraction circuit 21 and a signal from the retrace or flyback pulse source 20 is applied to a second input to the subtraction circuit 21. The flyback pulse is obtained from the secondary winding of the flyback transformer (not shown). The output from the subtraction circuit 21 is a pulse representing the retrace pulse minus the burst gate pulse. The burst gate pulse is also applied to the sample-and-hold 16 in a manner identical to the prior art and the output from the subtraction circuit 21 is applied to the sample-and-hold 17. Since the flyback interval is much smaller than the forward line scan interval and only slightly greater than the period of the burst signal, the sampling interval of the circuit 16 is comparable with that of the circuit 17. Therefore, the sampled and stored voltages in the circuits 16 and 17 tend to discharge at substantially equal rates.

Figure 3:
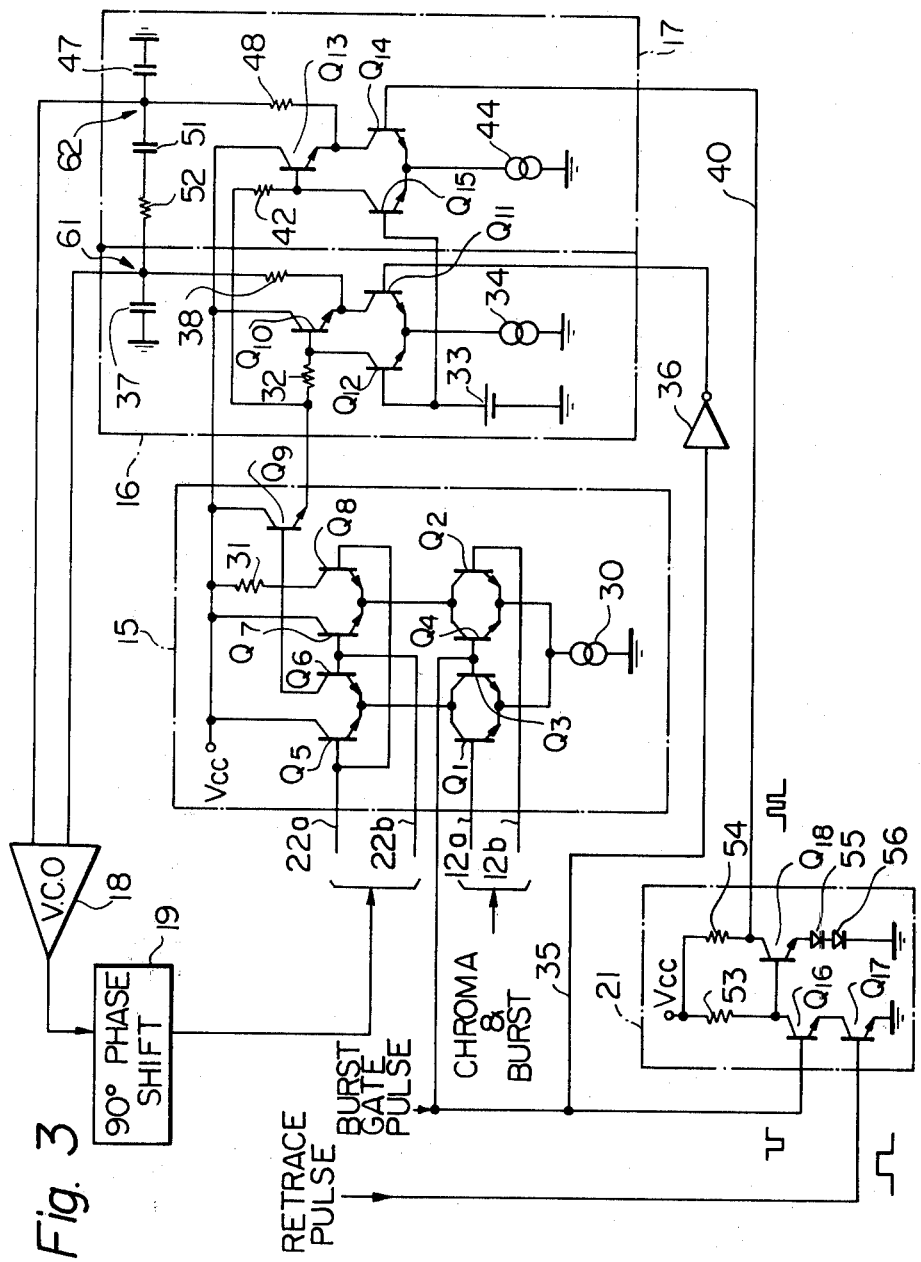
FIG. 3 is a detailed circuit diagram of the embodiment of FIG. 2.

Details of the circuit of FIG. 2 are illustrated in FIG. 3. The chroma and burst signals supplied from the processor 11 are applied on leads 12a and 12b to the base electrodes of transistors Q1 and Q2 of the phase detector 15. Transistor Q1 has its emitter and collector connected to the emitter and collector of a transistor Q3. Similarly transistor Q2 has its emitter and collector connected to the emitter and collector of transistor Q4, transistors Q1, Q3 and Q2, Q4 have their emitters connected through the constant current source 30 to ground. The base electrodes of transistors Q3 and Q4 are connected together to the burst gating pulse source 14 to turn off Q3 and Q4 in the presence of a negative gating pulse to turn on transistors Q1 and Q2, so that transistors Q3 and Q4 serve as the function of the burst gate 13 of FIG. 2. The signal from the phase shifter 19 is applied to the base electrodes of transistors Q5, Q6, Q7 and Q8 on leads 22a and 22b. Transistors Q5 and Q6 have their emitters connected together to the collectors of transistors Q1 and Q3 and their collectors connected to a voltage supply Vcc and through a load resistor 31 to the voltage supply Vcc, respectively. Similarly, transistors Q7 and Q8 have their emitters connected together to the collectors of transistors Q2 and Q4 and their collectors connected to the voltage supply Vcc and through the load resistor 31 to the voltage supply, respectively. During a first half cycle when the signal on lead 22a is positive, transistors Q5 and Q8 will be turned on and a current will be drawn through transistors Q2 and Q8 when the signal on lead 12b is positive, thereby developing a voltage across the load resistor 31. Similarly, during the next half cycle transistors Q6 and Q7 will be turned on and a current will be drawn through transistors Q6 and Q1. The voltage produced across the load resistor 31 is passed to the signal sample-and-hold circuit 16 through transistor Q9. The input signal to the sample-and-hold 16 is coupled through resistor 32 to the base of a transistor Q10 having its emitter connected to the collector of a transistor Q11 and its collector connected to the voltage supply Vcc. Transistor Q12 is provided having its collector connected to the base of transistor Q10 and its base connected to the positive terminal of a bias source 33. Transistors Q11 and Q12 have their emitters connected together through a constant current source 34 to ground. The burst gating pulse is applied on lead 35 through an inverter 36 to the base of transistor Q11. A capacitor 37 and a resistor 38 are series connected between ground and the junction between the emitter of transistor Q10 and the collector of transistor Q11.

Transistor Q12 is normally turned on by the potential supplied from the bias source 33 to draw current through resistor 32 to cause voltage drop thereacross to turn off transistor Q10. At the time of occurrence of the burst gating pulse, transistors Q3 and Q4 are reversely biased to turn on transistors Q1 and Q2, and the inverted pulse drives transistor Q11 into conduction, thereby turning transistor Q10 on. The voltage across the load resistor 31 of the phase detector 15 is sampled and the filter capacitor 37 is charged to a level proportional to the amplitude of the sampled signal.

Figure 4:
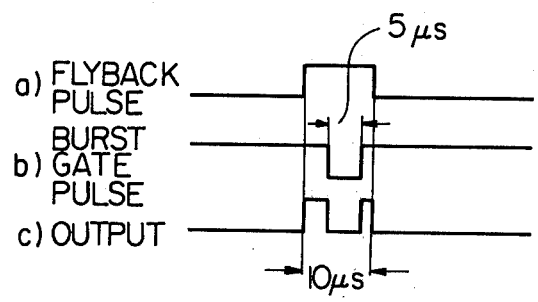
FIG. 4 is a waveform diagram useful for describing the operation of the subtraction circuit in FIG. 3.

The bias sample-and-hold circuit 17 includes transistors Q13, Q14 and Q15 connected in a manner similar to transistors Q10 to Q12 of the signal sample-and-hold 16 with the exception that the base of transistor Q14 is connected over lead 40 to the output of the subtraction circuit 21. The circuit 21 comprises transistors Q16 and Q17 connected such that a current is drawn from the voltage supply Vcc through a load resistor 53 and through the collector-to-emitter paths of both transistors to ground. The base of transistor Q16 is coupled to the burst gating pulse source 14 while the base of transistor Q17 is coupled to the retrace pulse source 20. The collector of transistor Q16 is connected to the base of transistor Q18 which has its collector connected through a load resistor 54 to the voltage supply Vcc and its emitter connected through series-connected diodes 55, 56 to ground. The collector of transistor Q18 is further connected to the base of transistor Q14 of bias sample-and-hold circuit 17. The transistor Q17 is turned on during the flyback period having the duration of approximately 10 microseconds. The transistor Q16 is normally turned on so that the current drawn by the transistors Q16 and Q17 develops a negative voltage at the collector of Q16 which is applied to the base of transistor Q18 to turn it on. When transistor Q16 is turned off by the negative-going burst gating pulse applied to its base electrode, the current through load impedance 53 is impeded and transistor Q18 is turned on. Since the burst gating pulse occurs within the flyback period, the voltage developed across the load resistor 54 is positive goging pulses with a total duration of about 5 microseconds as illustrated in FIG. 4.

The output pulse from the subtraction circuit 20 is applied to the base of transistor Q14. Since the operation of the sample-and-hold circuit 17 is identical to that of circuit 16, the voltage developed across resistor 31 is sampled during the period outside of the burst period for the same duration as the burst period. A capacitor 47 connected through resistor 48 is charged through transistor Q13 by the sampled voltage. A filter network consisting of a capacitor 51 and a resistor 52 is connected across node 61 between capacitor 37 and resistor 38 and node 62 between capacitor 47 and resistor 48. The voltage developed across the nodes 61 and 62 is connected to the voltage controlled oscillator 18 and phase shifted by 90° at 19 and applied to the phase detector 15.

Since the sampling intervals of the circuits 16 and 17 substantially equal to each other, the voltages across capacitors 37 and 47 discharge at the same rate so that the problem that has been encountered with the prior art sample-and-hold circuits can be effectively eliminated.

Figure 5:
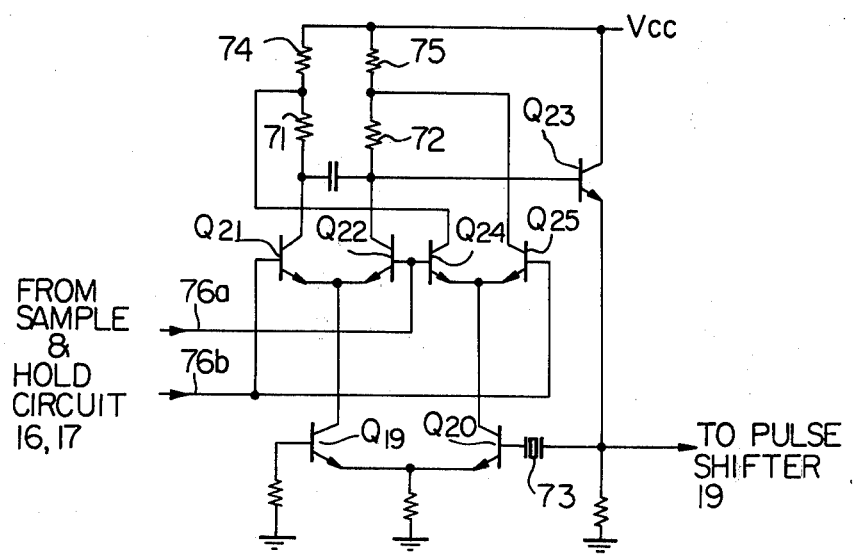
FIG. 5 is an exemplary circuit of the voltage controlled oscillator of FIG. 3.

The voltage controlled oscillator 18 suitable for use with the embodiment of the present invention comprises, as shown in FIG. 5, a differential current amplifier consisting of transistors Q19 and Q20 with the collector of Q19 driving the emitters of a common mode pair consisting of transistors Q21 and Q22 with identical collector resistances 71 and 72 with a noninverting feedback connection from the collector of Q22 and an emitter-follower Q23 to the base of transistor Q20 through a quarts crystal 73. Similarly, the collector of transistor Q20 drives a second common mode pair consisting of transistors Q24 and Q25 in phase opposition to Q21, Q22 with identical collector resistances 74 and 75 which share part of a common collector load with transistors Q21 and Q22. The bases of transistors Q22 and Q24 are connected together to one input lead 76a and the bases of transistors Q21 and Q25 are connected together to the other input terminal 76b, the input leads 76a and 76b being connected respectively to the nodes 61 and 62 of the sample-and-hold circuits 16, 17. The node voltage applied between the base pairs modifies the collector currents through transistors Q22 and Q24 relative to transistors Q21 and Q25, thereby changing the amplifier gain characteristic. This results in an ac voltage waveform inversion between collectors of Q21 and Q22.

Since the integrated circuit technique permits accurate control of the parameters of circuit components fabricated on an IC chip, the charge and discharge rates of the capacitors 37 and 47 of the sample-and-hold circuits can be substantially controlled at equal values by using the IC technique such that the resistors 38 and 48 have presicely equal values and transistors Q21, Q22, Q24, Q25 have presicely equal current amplification factors.

What is claimed is:

1. A subcarrier regeneration circuit for a color television receiver adapted to receive a composite color television signal including a color burst contained in a flyback interval and a chroma signal between successive ones of the flyback intervals, the subcarrier regeneration circuit comprises:
   a phase detector for generating an output representative of the difference in phase between the color burst and a reference subcarrier;
   a first sample-and-hold circuit operable to sample the output from the phase detector during the interval of the color burst and storing the sampled signal into a first capacitor;
   means for generating a sampling pulse with a duration equal to the flyback interval minus the interval of the color burst;
   a second sample-and-hold circuit operable to sample the output from the phase detector during the interval of said sampling pulse and storing the sampled signal into a second capacitor; and
   a voltage controlled oscillator receptive of the voltage difference between the first and second capacitors to generate a signal at said reference subcarrier and operable to control the frequency and phase of said subcarrier in accordance with said voltage difference.

2. A subcarrier regeneration circuit as claimed in claim 1, wherein said sampling pulse generating means comprises:
   means for generating a first gating pulse with a duration equal to the interval of said color burst in step with the occurrence of said color burst;
   means for generating a second gating pulse of a polarity opposite to the polarity of the first gating pulse with a duration equal to the flyback interval in step with the occurrence of said flyback interval;
   first, second and third transistors each having a collector-emitter path, the first and second transistors being connected such that their collector-emitter paths are connected in series with the emitter of the first transistor connected to the collector of the second transistor, the collector of the first transistor being connected to a voltage supply through a first load impedance and to the base of the third transistor, and the emitter of the second transistor being connected to ground, the third transistor having its collector connected to the voltage supply through a second load impedance and its emitter connected to ground through forwardly conducting diodes, the base of the first transistor being connected to receive said first gating pulse and the base of the second transistor being connected to receive said second gating pulse, whereby said sampling pulse is generated at the collector of said third transistor.

3. A subcarrier regeneration circuit as claimed in claim 2, wherein the reference subcarrier generated from the voltage controlled oscillator is phase shifted by 90°, prior to being applied to said phase detector.

4. A subcarrier regeneration circuit as claimed in claim 2, wherein said phase detector comprises:
   first and second pairs of transistors, the emitters of the first and second transistors in the first pair being connected together to ground through a constant current source and the collectors of the first and second transistors in said first pair being connected together to the emitters of the first and second transistors in the second pair, the collector of the first transistor in said second pair being connected to a voltage supply and the collector of the second transistor in said second pair being connected through a load impedance to said voltage supply;
   third and fourth pairs of transistors, the emitters of the first and second transistors in the third pair being connected together to ground through said constant current source and the collectors of the first and second transistors in said third pair being connected together to the emitters of the first and second transistors in the fourth pair, the collector of the first transistor in said fourth pair being connected to said voltage supply and the collector of the second transistor in said fourth pair being connected to said voltage supply through said load impedance;
   the base electrodes of the second transistor in said first pair and the first transistor in said third pair being connected together to receive said first gating pulse to be maintained off during the period of said first gating pulse, and the base electrode of the first transistor in said first pair being connected to a first input terminal and the base electrode of the second transistor in said third pair being connected to a second input terminal, the first and second input terminals being connected to receive the chroma signal and the color burst;
   the base electrodes of the second transistor in said second pair and the first transistor in said fourth pair being connected together to a third input terminal, and the base electrodes of the first transistor in said second air and the second transistor in said fourth pair being connected together to a fourth input terminal, the third and fourth input terminal being connected to receive said reference subcarrier generated from said voltage controlled oscillator.

5. A subcarrier regeneration circuit as claimed in claim 4, wherein each of said first and second sample-and-hold circuits comprises:
   first, second and third transistors, the emitters of the first and second transistors being connected together to ground through a constant current source, the base of the first transistor being connected to a bias voltage supply to be gated into conduction, the collector of the first transistor being connected to the load impedance of the phase detector through a first resistor and to the base of the third transistor, the collector of the second transistor being connected to the emitter of the third transistor and to the respective one of the first and second capacitors through a second resistor, the base of the second transistor of the first sample-and-hold circuit being connected to receive said first gating pulse to be gated into conduction, and the base of the second transistor of the second sample-and-hold circuit being connected to receive said sampling pulse.

6. A subcarrier regeneration circuit as claimed in claim 5, wherein said second resistors of the first and second sample-and-hold circuits have equal values of resistance.

* * * * *